(12) United States Patent
Cornelius et al.

(10) Patent No.: US 7,639,746 B2
(45) Date of Patent: Dec. 29, 2009

(54) HYBRID VOLTAGE/CURRENT-MODE TRANSMISSION LINE DRIVER

(75) Inventors: William P. Cornelius, Los Gatos, CA (US); Matthew K. Herndon, San Carlos, CA (US); Ronald K. Larson, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 621 days.

(21) Appl. No.: 11/173,109

(22) Filed: Jul. 1, 2005

(65) Prior Publication Data

US 2007/0002954 A1 Jan. 4, 2007

(51) Int. Cl.
*H04B 3/00* (2006.01)
*H04L 25/00* (2006.01)
(52) U.S. Cl. .................. 375/257; 375/222; 375/220; 375/219; 375/258
(58) Field of Classification Search .............. 375/257, 375/222, 220, 219, 258; 327/65, 108
See application file for complete search history.

(56) References Cited

U.S. PATENT DOCUMENTS 5,771,262 A * 6/1998 Benayoun et al. ........... 375/257
6,281,715 B1 * 8/2001 DeClue et al. ............... 327/65

* cited by examiner

*Primary Examiner*—Phuong Phu
(74) *Attorney, Agent, or Firm*—Park, Vaughan & Fleming LLP

(57) ABSTRACT

A system that transmits signals through a communication channel. During operation, the system receives a sequence of bits for transmission through the communication channel. While transmitting a given bit, the system determines if the given bit has the same state as the previously transmitted bit. If so, the system uses a voltage-mode driver to drive a signal through the communication channel. Otherwise, the system uses a current source coupled to the voltage-mode driver to boost the drive-level of the voltage-mode driver. Note that the current source supplies a current to the communication channel without changing the impedance of the voltage-mode driver. In this way, the present invention compensates for frequency dependant losses in the communication channel without sacrificing impedance matching and without substantially increasing power consumption.

15 Claims, 9 Drawing Sheets

HYBRID VOLTAGE/CURRENT-MODE TRANSMISSION LINE DRIVER

BACKGROUND

1. Field of the Invention

The present invention relates to techniques for communicating data through a communication channel. More specifically, the present invention relates to a method and apparatus for compensating for frequency dependent losses when transmitting signals through a lossy communication channel.

2. Related Art

Advances in semiconductor fabrication technology presently make it possible to integrate large-scale systems, including tens of millions of transistors, into a single semiconductor chip. Integrating such large-scale systems onto a single semiconductor chip enables increases in the frequency at which such systems can operate, because signals between system components do not have to cross chip boundaries, and are not subject to lengthy chip-to-chip propagation delays.

However, as the frequency of these systems increases, the communication channels used to transfer data between system components is rapidly becoming a bottleneck. At higher frequencies, a communication channel tends to attenuate the transmitted signal. Consequently, if the system transmits data through the communication channel at a sufficiently high frequency, data can be lost.

System designers often use voltage-mode drivers to transmit data through communication channels. In order to overcome the frequency dependent signal attenuation problem, some voltage-mode drivers perform a "pre-compensation" operation for higher frequency events to compensate for signal loss. This is accomplished by temporarily boosting the drive strength for high frequency events. Unfortunately, boosting the drive strength in a voltage-mode driver also involves decreasing the source resistance of the driver, which can cause an impedance mismatch with the characteristic impedance of the communication channel.

Voltage-mode drivers typically have a drive-strength which is inversely proportional to the source resistance. Therefore, once the source resistance of the voltage-mode driver is set to match the impedance of the communication channel, the drive-strength of the voltage-mode driver is fixed. Hence, a voltage-mode driver cannot compensate for these frequency-dependent losses without causing a corresponding impedance mismatch.

One solution to this problem is to use a current-mode driver which has a source resistance that matches the line impedance of the communication channel. The drive strength of a current-mode driver can be boosted by increasing the current, without changing the source resistance. Unfortunately, a current-mode driver uses significantly more power than the voltage-mode driver, which makes such drivers impractical for many applications.

Hence, what is needed is a method and an apparatus for increasing the data transfer rate through a communication channel without the problems described above.

SUMMARY

One embodiment of the present invention provides a system that transmits signals through a communication channel. During operation, the system receives a sequence of bits for transmission through the communication channel. While transmitting a given bit, the system determines if the given bit has the same state as the previously transmitted bit. If so, the system uses a voltage-mode driver to drive a signal through the communication channel. Otherwise, the system uses a current source coupled to the voltage-mode driver to boost the drive-level of the voltage-mode driver. Note that the current source supplies a current to the communication channel without changing the impedance of the voltage-mode driver. In this way, the present invention compensates for frequency dependant losses in the communication channel without sacrificing impedance matching and without substantially increasing power consumption. Note that this configuration saves power because the current source does not consume any power when it is turned off (i.e. when the given bit is the same as the previously transmitted bit).

In a variation on this embodiment, the current source is activated independently from the voltage-mode driver, thereby facilitating the optimization of the shape of the transmitted signal.

In a variation on this embodiment, more than one current source is used to compensate for frequency dependant losses in the communication channel. Furthermore, each current source is activated separately from the other current sources as well as the voltage-mode driver, thereby facilitating the optimization of the shape of the transmitted signal.

In a variation on this embodiment, a sequence of previously transmitted bits is used to control the current source to compensate for the frequency dependant losses in the communication channel.

In a variation on this embodiment, the voltage-mode driver is a differential driver.

In a variation on this embodiment, the impedance of the voltage-mode driver substantially equals the impedance of the communication channel.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Voltage-Mode Drivers

Figure 1A:
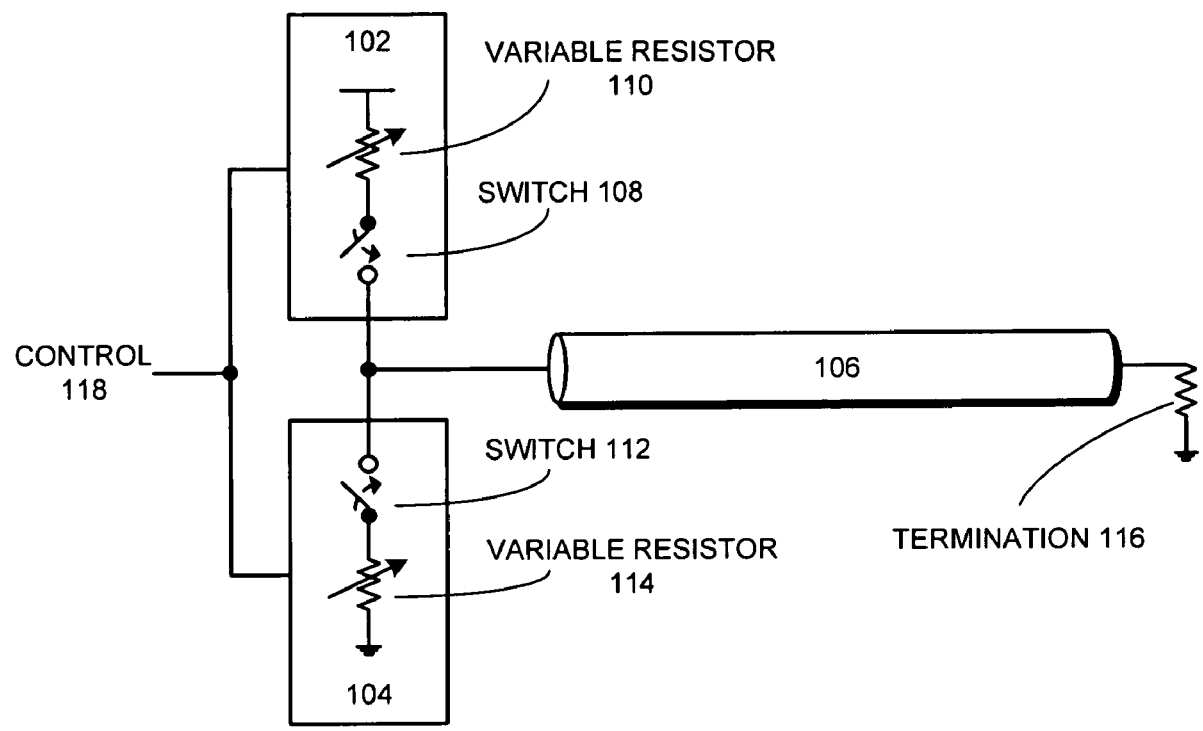
FIG. 1A presents a block diagram of a voltage-mode driver.

FIG. 1A presents a block diagram of a voltage-mode driver. It contains pull-up network 102, pull-down network 104, communication channel 106, switches 108 and 112, variable resistors 110 and 114, termination 116, and control signal 118.

When the voltage-mode driver transmits a high bit, control signal 118 closes switch 108 and current flows from the power supply, through variable resistor 110 to charge up communication channel 106. Note that switch 112 remains open when transmitting a high bit. Similarly, when the voltage-mode driver transmits a low bit, control signal 118 closes switch 112 and current flows from the communication channel, through variable resistor 114 to ground. Note that switch 108 remains open when transmitting a high bit.

Note that pull-up network 102 and pull-down network 104 can be implemented in any semiconductor technology, including: CMOS, biCMOS, GaAs, etc. In a standard CMOS process, the pull-up network includes a PMOS transistor and the pull-down network includes a NMOS transistor. Note that more than one PMOS and more than one NMOS transistor can be used in the voltage-mode driver.

In one embodiment of the present invention, the voltage-mode driver drives the voltage on the communication channel to half of the supply voltage (i.e. VDD/2). Note that VDD is the positive power supply.

Figure 1B:
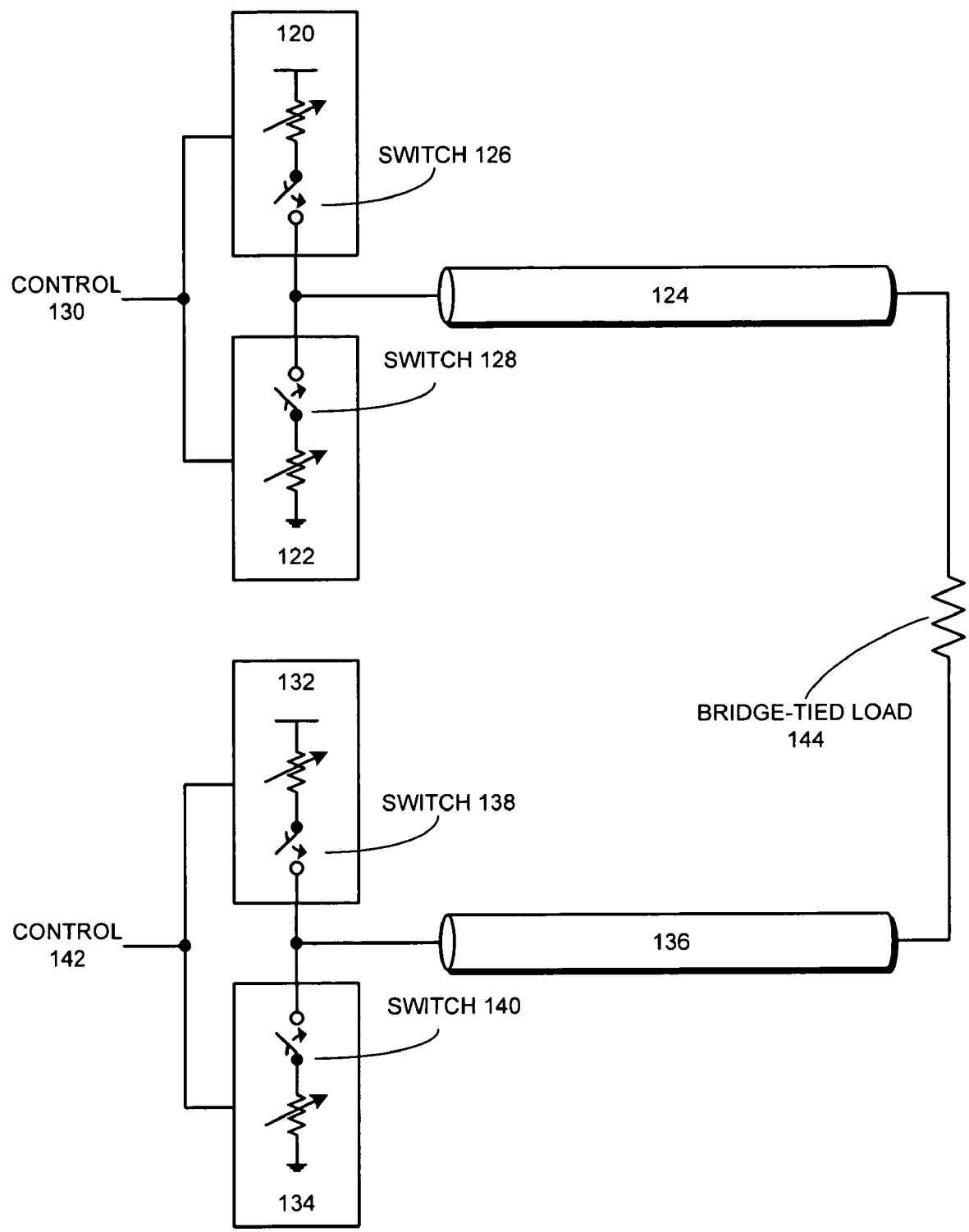
FIG. 1B presents a block diagram of voltage-mode drivers configured for differential-mode operation.

In high-speed communications and applications where noise is a concern, the voltage-mode drivers are configured for differential-mode operation. FIG. 1B presents a block diagram of voltage-mode drivers configured for differential-mode operation. It contains pull-up networks 120 and 132, pull-down networks 122 and 134, switches 126, 128, 138, and 140, communication channels 124 and 136, control signals 130 and 142, and bridge-tied load 144.

When the differential voltage-mode driver transmits a high bit, control signal 130 closes switch 126 and leaves switch 128 open. Control signal 142 closes switch 140 and leaves switch 138 open. Current flows from the power supply in pull-up network 120, through communication channel 124, through bridge-tied load 144, through communication channel 136, and to ground in pull-down network 134.

Similarly, when the differential voltage-mode driver transmits a low bit, control signal 130 closes switch 128 and leaves switch 126 open. Control signal 142 closes switch 138 and leaves switch 140 open. Current flows from the power supply in pull-up network 132, through communication channel 136, through bridge-tied load 144, through communication channel 124, and to ground in pull-down network 122.

Note that the system can alternatively be configured so that the current flows in the opposite direction. For instance, when transmitting a high bit, control signal 130 closes switch 128 and leaves switch 126 open. Control signal 142 closes switch 138 and leaves switch 140 open. Therefore, current flows from the power supply in pull-up network 132, through communication channel 136, through bridge-tied load 144, through communication channel 124, and to ground in pull-down network 122.

Note that voltage-mode drivers have a drive-level which is approximately a linear function of the source resistance. Therefore, once the source resistance of the voltage-mode driver is set to match the impedance of the communication channel, the drive-level of the voltage-mode driver is fixed. In order to get a stronger drive-strength, the resistance of the voltage-mode driver must be reduced. Unfortunately, by reducing the resistance of the voltage-mode driver, the impedance of the driver is no longer matched with the impedance of the communication channel, which can cause noise problems on the communication channel. Note that noise results when the impedance mismatch causes electrical energy to reflect back and forth through the network.

Current-Mode Drivers

Figure 2A:
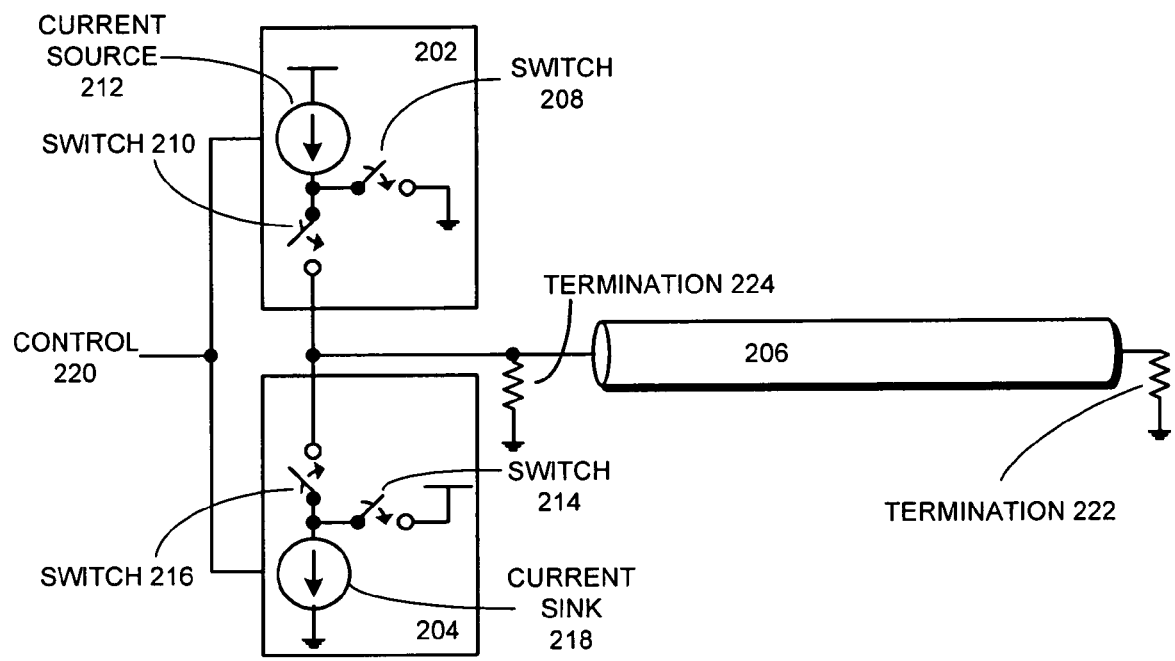
FIG. 2A presents a block diagram of a current-mode driver.

FIG. 2A presents a block diagram of a current-mode driver. It contains pull-up network 202, pull-down network 204, communication channel 206, switches 208, 210, 214, and 216, current source 212, current sink 218, control signal 220, and termination 222 and 224.

When the current-mode transmits a high bit, control signal 220 closes switches 210 and 214 and leaves switches 208 and 216 open. This causes current to flow from the power supply in pull-up network 202 into communication channel 206. Note that closing switch 214 provides a current path from the power supply to ground through pull-down network 204.

When the current-mirror-logic driver transmits a low bit, control signal 220 closes switches 208 and 216 and leaves switches 210 and 214 open. This causes current to flow from communication channel 206 to ground through pull-down network 204. Note that closing switch 208 provides a current path from the power supply to ground through pull-up network 202.

Note that this current-mode driver has a source resistance that matches the line impedance of the communication channel. The current source is a Norton-equivalent current source, which has a source resistance in parallel with the current source (not shown in FIG. 2). Furthermore, this source resistance is set independently of the drive-level. Hence, the drive-level of the current-mode driver can be adjusted without affecting the impedance of the current-mode driver.

Note that the act of closing switch 208 by itself dumps current from current source 212 to ground, which causes the circuit to consume power.

Also note that pull-up network 202 and pull-down network 204 can be implemented in any semiconductor technology, including: CMOS, biCMOS, GaAs, etc. In a standard CMOS process, the current source in the pull-up network includes a current mirror circuit that mirrors a current from a reference current source. Similarly, current sink in the pull-down network also includes a current mirror circuit that mirrors a current from a reference current sink. Note that these current sources and current sinks consume power at all times.

Figure 2B:
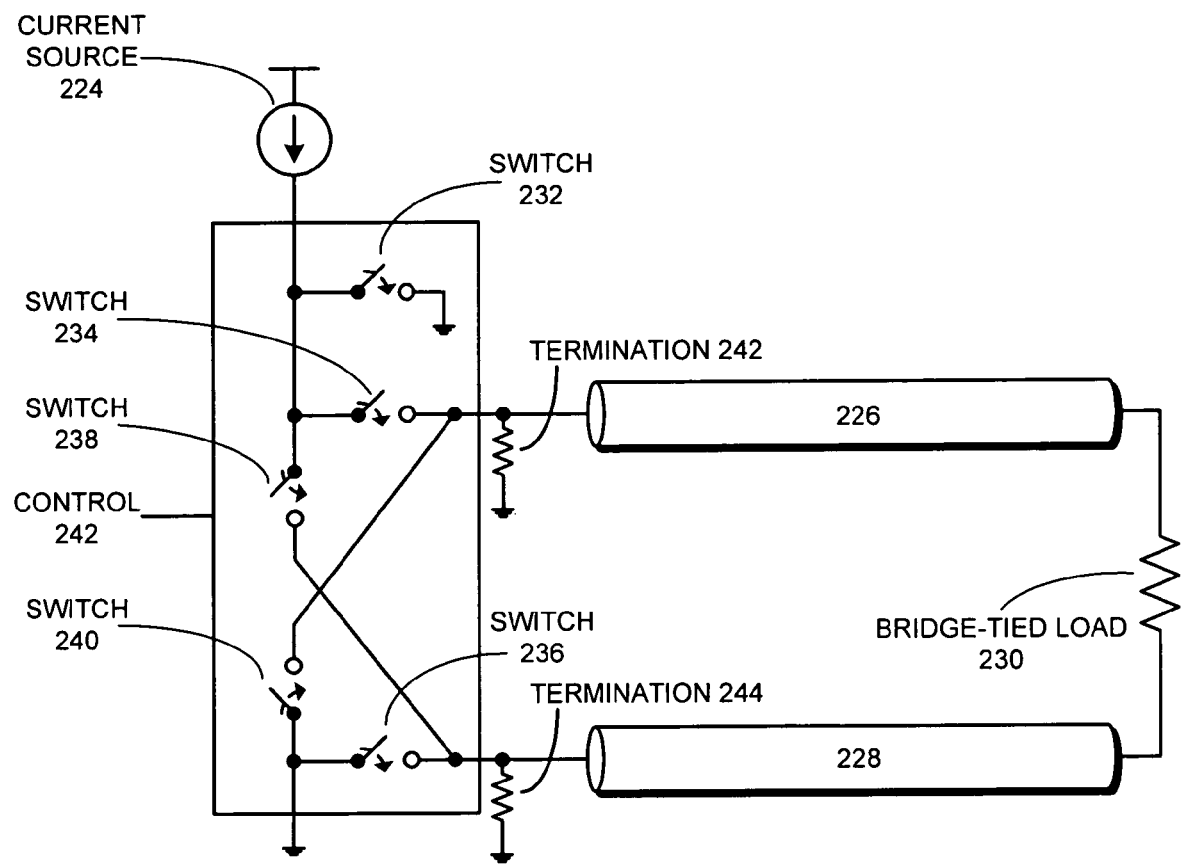
FIG. 2B presents a block diagram of current-mode drivers configured for differential-mode operation.

FIG. 2B presents a block diagram of current-mode drivers configured for differential-mode operation. It contains current source 224, communication channels 226 and 228, bridge-tied load 230, switches 232, 234, 236, 238, and 240, control signal 242, and terminations 242 and 244.

When transmitting a high bit, control signal 242 closes switches 234 and 236 and leaves switches 232, 238, and 240 open. This causes current to flow from current source 224, through communication channel 226, through bridge-tied load 230, through communication channel 228, and to ground.

When transmitting a low bit, control signal 242 closes switches 238 and 240 and leaves switches 232, 234, and 236 open. This causes current to flow from current source 224, through communication channel 228, through bridge-tied load 230, through communication channel 226, and to ground.

Note that the system can alternatively be configured so that the current flows in the opposite direction. For instance, when transmitting a high bit, control signal 242 can close switches 238 and 240 and leave switches 232, 234, and 236 open. This causes current to flow from current source 224, through communication channel 228, through bridge-tied load 230, through communication channel 226, and to ground.

Note that since current is always flowing in the current-mode driver, it consumes more power than the voltage-mode driver.

Also note that closing switch 232 by itself dumps current from current source 224 to ground, which causes the circuit to consume power.

Coupled Voltage-Mode and Current-Mode Drivers

Figure 3A:
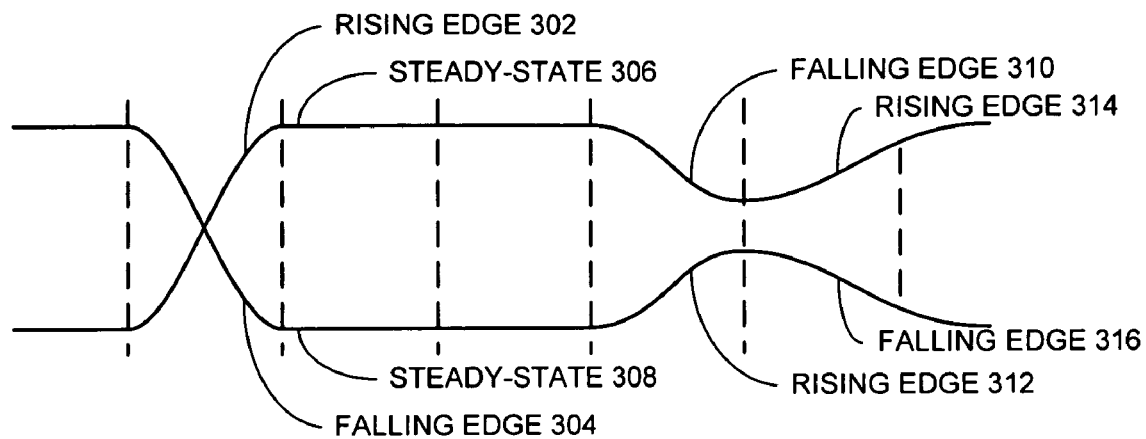
FIG. 3A illustrates an idealized voltage-versus-time plot of a signal after transmission through a lossy communication channel.

FIG. 3A illustrates an idealized voltage-versus-time plot of a signal after transmission through a lossy communication channel. This plot illustrates a differential signaling scheme wherein the driver transmits three high bits, a low bit, and then a high bit. It contains rising edges 302, 312, and 314, falling edges 304, 310, and 316, and steady states 306 and 308. The curve initially going high is the "plus" differential line and the curve initially going low is the "minus" differential line.

When transmitting a high signal, the driver causes rising edge 302 in the "plus" differential line and falling edge 304 in the "minus" differential line. Since the driver needs to transmit two more high bits, the driver holds the signal steady (steady states 306 and 308) until the next transition. The driver then causes falling edge 310 in the "plus" differential line and rising edge 312 in the "minus" differential line to transmit a low bit. After transmitting the low bit, the "plus" differential line returns high (rising edge 314) and the "minus" differential line returns low (falling edge 316) to transmit a high bit.

Note that the voltage level for the "plus" differential line never crosses the voltage level for the "minus" differential line after the driver transmits a low bit because the frequency dependent losses in the communication channel attenuates the high-frequency components of the rising and falling edge signals so that the full voltage range is not reached prior to the next transition. Hence, in this case, the differential lines do not have the correct voltages for the bits transmitted. Also note that the communication channel does not attenuate steady state signals.

Furthermore, note that the transition from a high state to a low state occurs over several bit times. In FIG. 3A, each bit time is denoted by the vertical dashed-line.

In one embodiment of the present invention, in order to boost the drive-strength of the voltage-mode driver, a current source is coupled to the voltage-mode driver. The resistance of the voltage-mode driver is set such that it matches the impedance of the communication channel. As mentioned previously, the current source can boost the signal without affecting the impedance of the driver. In order to compensate for the frequency dependent losses, during a signal transition, the current source boosts the drive-strength of the voltage-mode driver. After the signal transitions, the system turns off the current source and returns the drive-level to a lower value by only maintaining power to the voltage-mode driver.

Figure 3B:
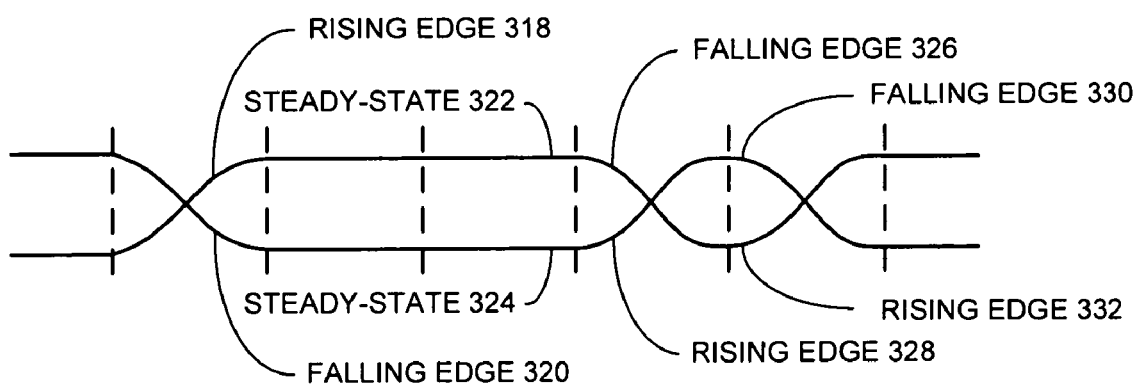
FIG. 3B illustrates an idealized voltage-versus-time plot of a signal after transmission through a lossy communication channel using a current source to boost the drive-level of a voltage-mode driver.

FIG. 3B illustrates an idealized voltage-versus-time plot of a signal after transmission through a lossy communication channel using a current source to boost the drive-level of the voltage-mode driver. This plot illustrates a differential signaling scheme wherein the driver transmits three high bits, a low bit, and then a high bit. It contains rising edges 318, 328, and 332, falling edges 320, 326, and 330, and steady states 322 and 324. The curve initially going high is the "plus" differential line and the curve initially going low is the "minus" differential line.

Note that after causing rising edge 318 in the "plus" differential line and falling edge 320 in the "minus" differential line to transmit a high bit, the driver holds the signal steady to transmit the other two high bits (steady states 322 and 324). Note that the voltage levels of steady states 322 and 324 are lower than the voltage levels at steady states 306 and 308 in FIG. 3A. By doing so, when the driver transmits a low bit by causing falling edge 326 in the "plus" differential line and rising edge 328 in the "minus" differential line, the "plus" differential line crosses the voltage level of the "minus" differential line even though the driver subsequently transmits a high bit (rising edge 332 and falling edge 330). In this case, the boost-enabled driver compensates for frequency dependent losses and yields the correct voltage levels for the bits transmitted. Also note that the boost-enabled driver makes the signal eye larger and thereby facilitates easier detection of the signal.

Also, note that the transition from a high state to a low state occurs over several bit times. In FIG. 3B, each bit time is denoted by the vertical dashed-line.

Figure 4:
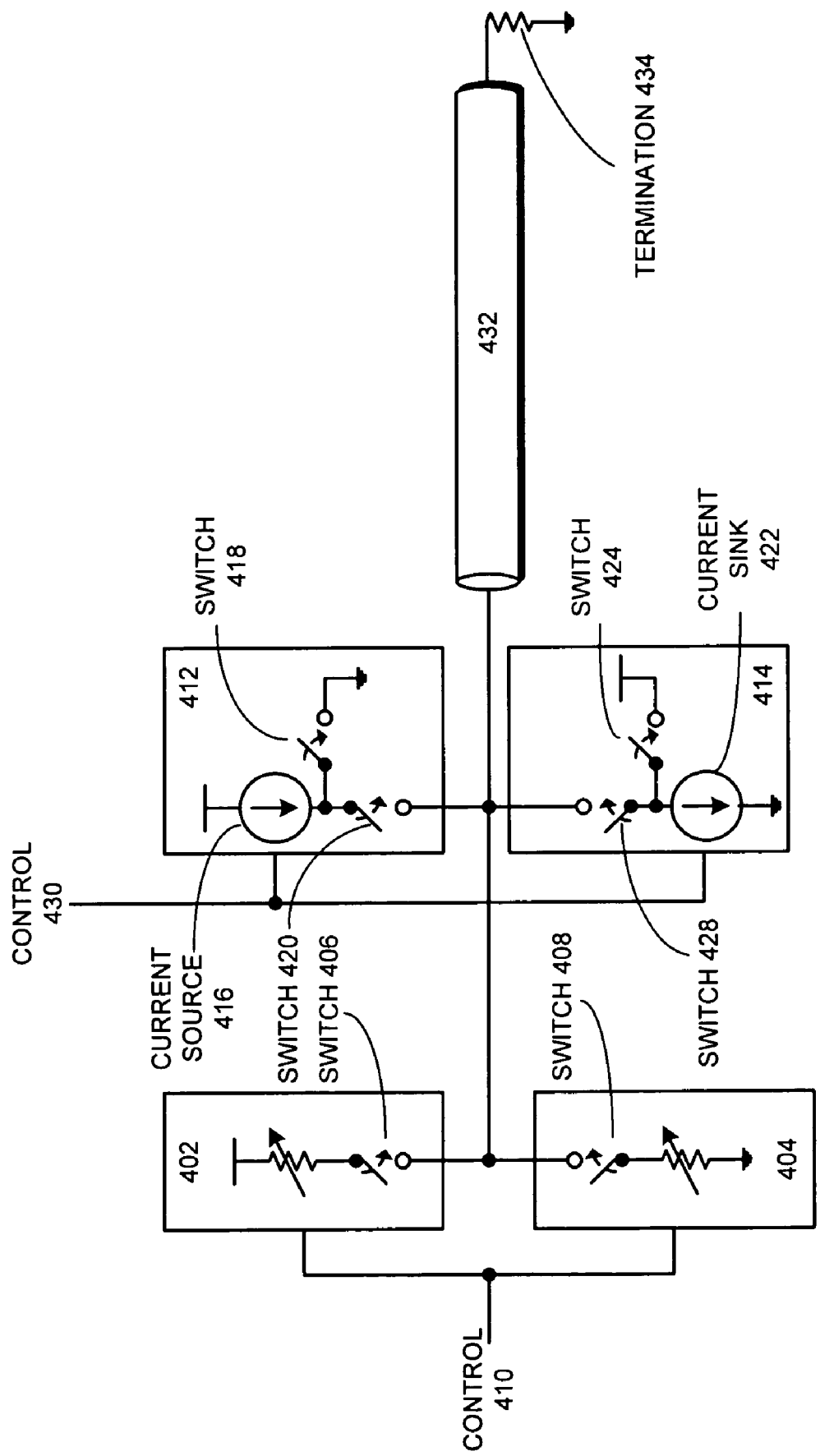
FIG. 4 presents a block diagram of a current source coupled to a voltage-mode driver in accordance with an embodiment of the present invention.

FIG. 4 presents a block diagram of a current source coupled to a voltage-mode driver in accordance with an embodiment of the present invention. It contains pull-up networks 402 and 412, pull-down networks 404 and 414, switches 406, 408, 418, 420, 424, 428, control signals 410 and 430, current source 416, current sink 422, communication channel 432, and termination 434.

Pull-up network 402 and pull-down network 404 form the voltage-mode driver. Pull-up network 412 and pull-down network 414 form the current source. This circuit operates in a similar manner as described in FIG. 1A and FIG. 2A. The only difference is that when transmitting a bit which has a state different from the previously transmitted bit, the system activates the current source to boost the signal. For instance, when transmitting a high bit after transmitting a low bit, control signal 430 closes switches 420 and 424 and leaves switches 418 and 428 open. Current flows from the power source in pull-up network 412, through communication channel 432 to boost the signal transmitted by the voltage-mode driver. If the driver is transmitting the same bit, or in other words maintaining the same signal state, the current source is not used.

In one embodiment of the present invention, the current source and current sink are sized in order to provide sufficient current to boost the voltage-level of the transmitted signal provided by the voltage-mode driver to compensate for frequency dependent losses in the communication channel. In this embodiment, the current source consumes less power than a pure current-mode driver because the current source provides a boost to the drive-strength of the voltage mode driver instead of providing the full drive-strength.

Figure 5:
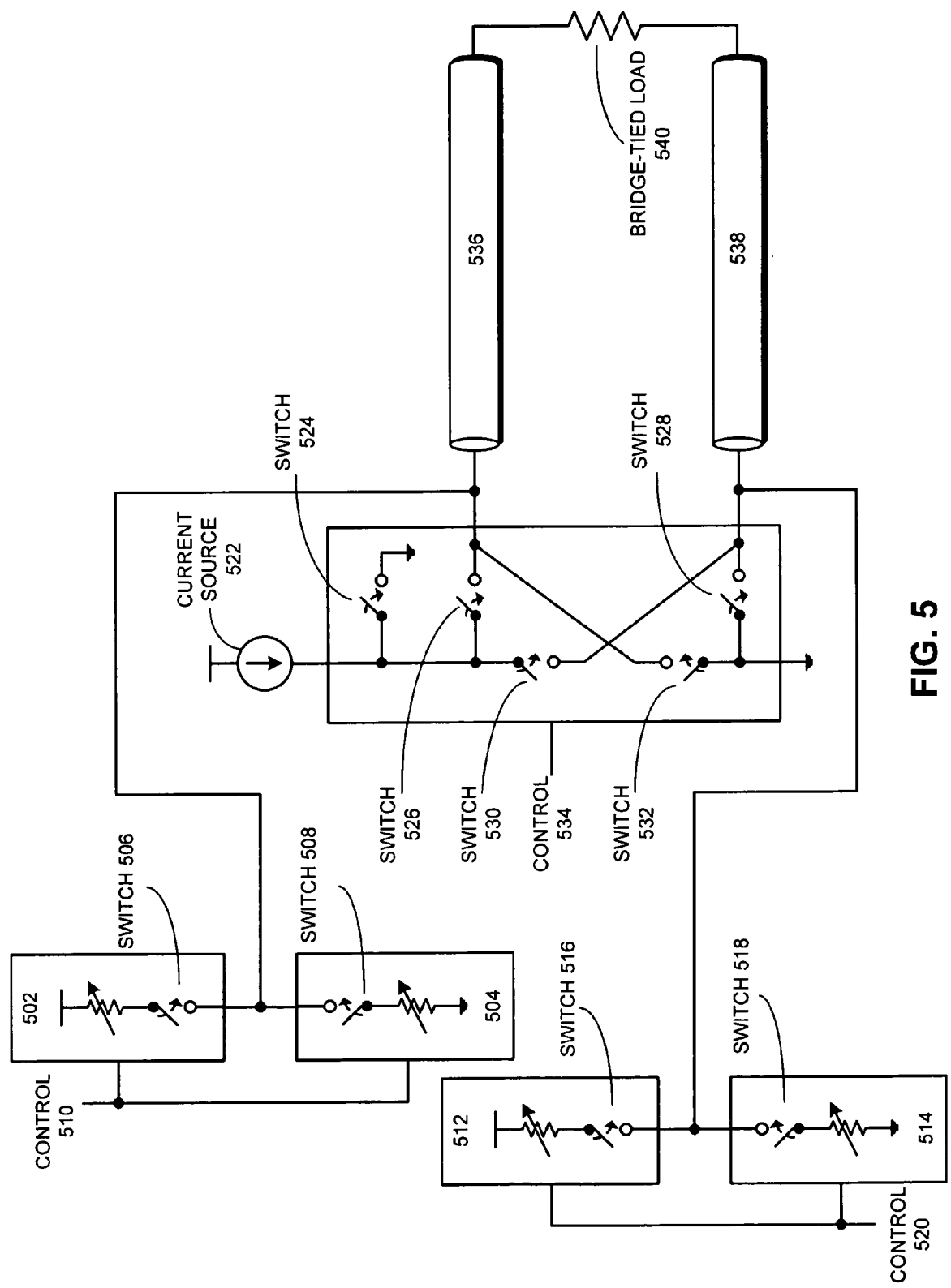
FIG. 5 presents a block diagram of a current source coupled to a voltage-mode driver configured for differential-mode operation in accordance with an embodiment of the present invention.

FIG. 5 presents a block diagram of a current source coupled to a voltage-mode driver configured for differential-mode operation in accordance with an embodiment of the present invention. It contains pull-up network 502 and 512, pull-down network 504 and 514, switches 506, 508, 516, 518, 524, 526, 528, 530, 532, control signals 510, 520, and 534, current source 522, communication channels 536 and 538, and bridge-tied load 540.

Both the differential voltage-mode driver and the current source operate in a similar manner as described in FIG. 1B and FIG. 2B. The only difference is that when transmitting a bit which has a state different from the previously transmitted bit, the system activates the current source to boost the signal. For instance, when transmitting a high bit after transmitting a low bit, control signal 534 closes switches 526 and 528 and leaves switches 524, 530, and 532 open. Current flows from current source 522 through communication channel 536, through bridge-tied load 540, through communication channel 538, and to ground. If the driver is transmitting a bit with the same state as a previously transmitted bit, or in other words maintaining the same signal state, the current source is not used.

In one embodiment of the present invention, the activation of the current source does not occur at the same time as the activation of the voltage-mode driver, thereby facilitating the optimization of the shape of the transmitted signal in addition to boosting the drive-level of the transmitted signal. In one embodiment of the present invention, multiple current sources are used to optimize the shape of the transmitted signal after traversing a channel with frequency dependent losses.

Transmitted Signal Shaving

Figure 6:
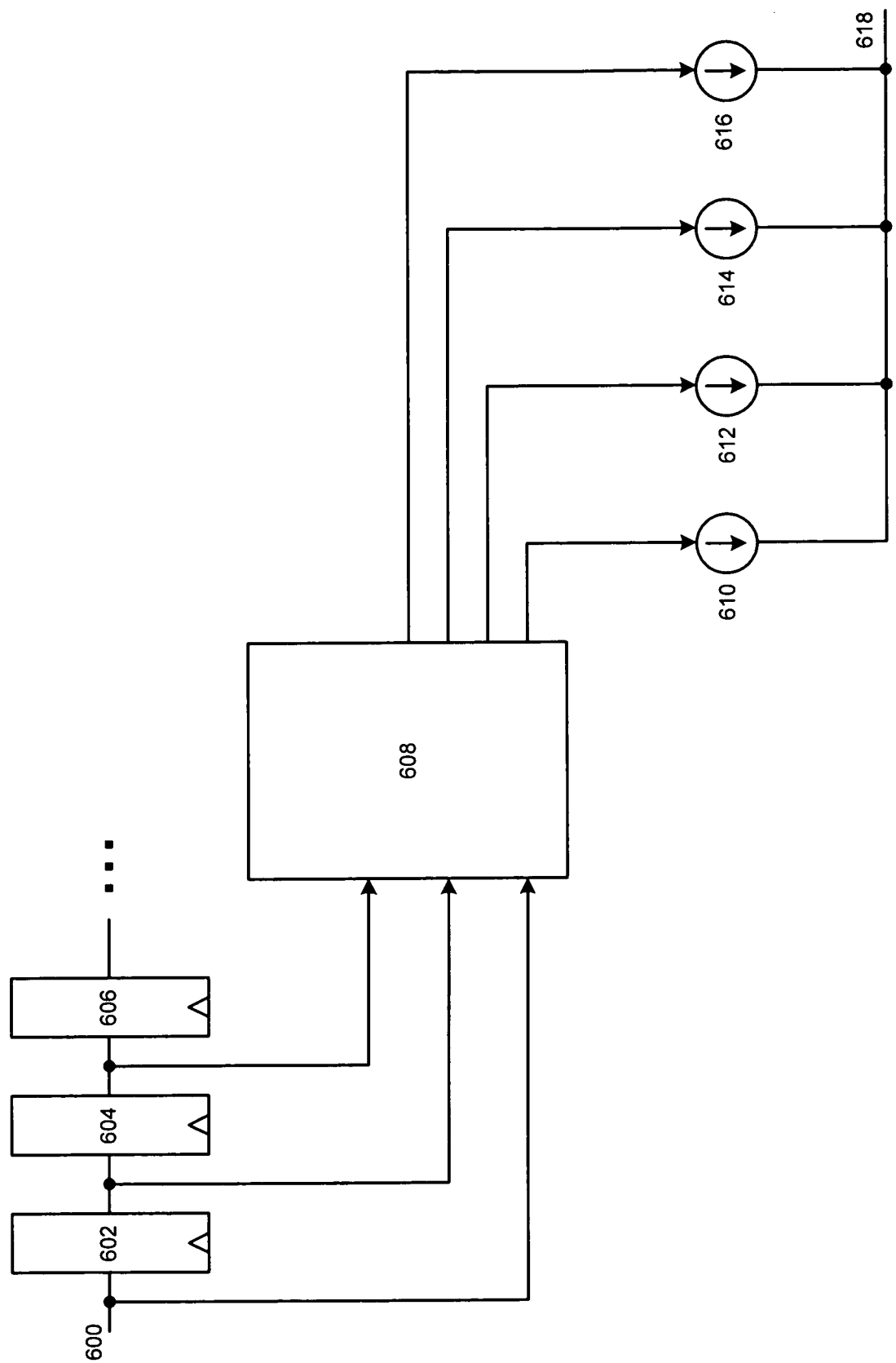
FIG. 6 presents a block diagram of multiple current source used to optimize the shape of the transmitted signal in accordance with an embodiment of the present invention.

FIG. 6 presents a block diagram of multiple current sources used to optimize the shape of the transmitted signal in accordance with an embodiment of the present invention. It contains input 600, flip-flops 602, 604, and 606, decoder 608, current sources 610, 612, 614, and 616, and output 618. The current sources boost the signal strength generated by the voltage-mode driver by injecting current through output 618, which is coupled to the communication channel.

During operation, a bit stream enters at input 600. The system compares the given bit at input 600 to the previously transmitted bit in flip-flop 602. Decoder 608 determines if the previously transmitted bit and the given bit have the same state. If the previously transmitted bit and the given bit have different states, decoder 608 activates the current sources to optimize the shape and to boost the drive-level of the transmitted signal. In one embodiment of the present invention, decoder 608 activates only one of the current sources. For instance, decoder 608 activates current source 610. In one embodiment of the present invention, decoder 608 activates more than one of the current sources to boost the signal sent by the voltage-mode driver. For instance, decoder 608 activates current sources 612 and 616.

In one embodiment of the present invention, the system looks at more than just the previously transmitted bit in order to boost the signal sent by the voltage-mode driver. For instance, when comparing the history of the transmitted bits to the given bit at input 600, the system looks at the previously transmitted bit stored in flip-flop 602 as well as the bit transmitted prior to the previously transmitted bit, which is stored in flip-flop 604. Decoder 608 then activates the current sources to optimize the shape and boost the drive-level of the transmitted signal. For instance, if the given bit is low, the previously transmitted bit was high, and bit prior to the previously transmitted bit was high, decoder 608 activates current sources 610, 612, and 614. However, if the given bit is low, the previously transmitted bit is high, and the bit prior to the previously transmitted bit is low, decoder 608 only activates current sources 614.

In one embodiment of the present invention, the current sources have different drive strengths in order to facilitate the optimization of the shape and to boost the drive-level of the transmitted signal. In one embodiment of the present invention, the activation of the current sources does not occur at the same time as the activation of the voltage-mode driver. If more than one current source is coupled to the voltage-mode driver, the system can activate each current-mode-driver separately from the other drivers, thereby facilitating the optimization of the shape and to boost the drive-level of the transmitted signal.

In one embodiment of the present invention, decoder 608 is a look-up-table.

Boosting Signal Strength

Figure 7:
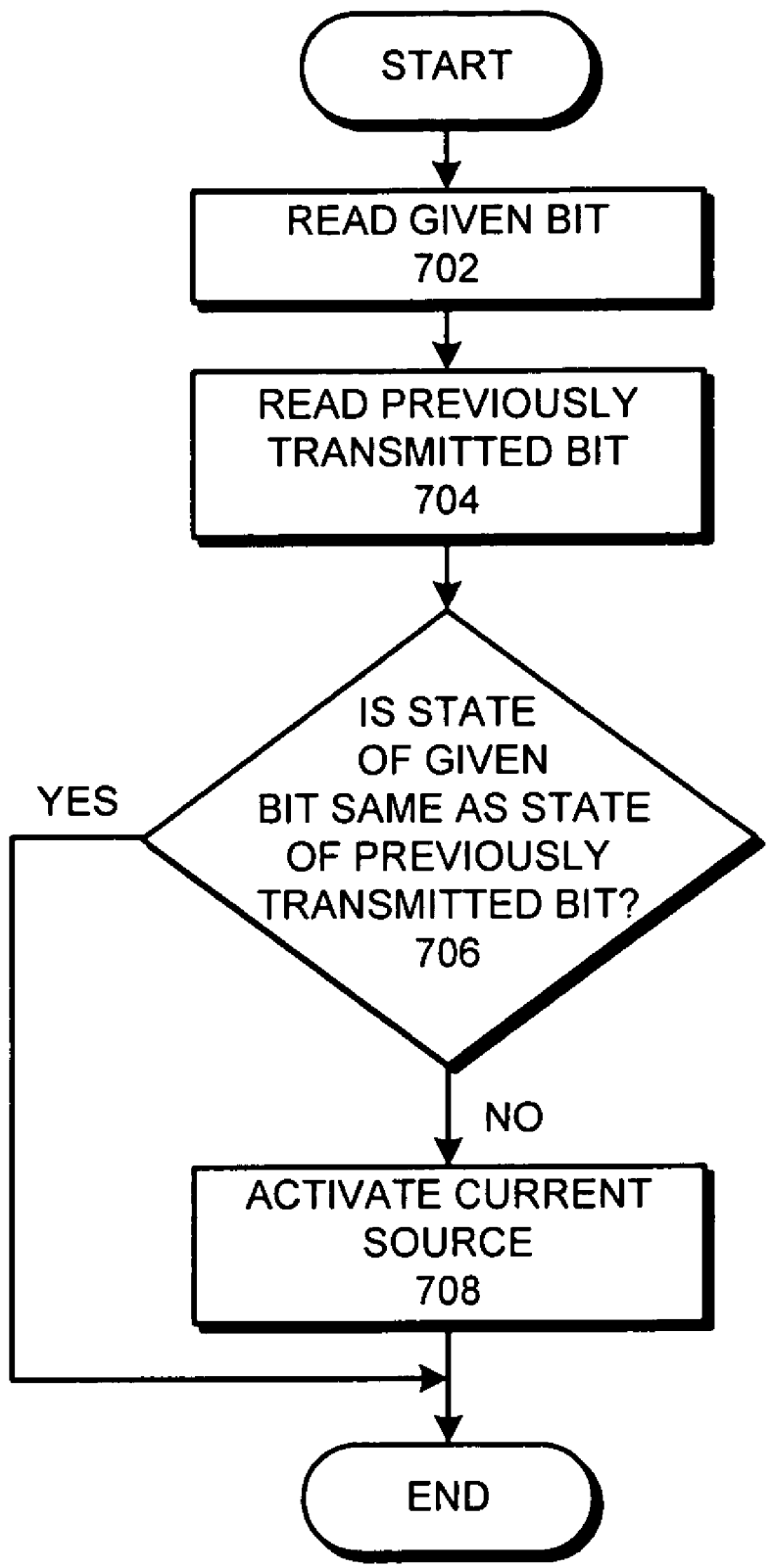
FIG. 7 presents a flow chart illustrating process of activating the current source to boost the drive-level of a voltage-mode driver in accordance with an embodiment of the present invention.

FIG. 7 presents a flow chart illustrating process of activating the current source to boost the drive-level of the voltage-mode driver in accordance with an embodiment of the present invention. The process begins when the system reads the state of the given bit to be transmitted (step 702). The system then reads the state of the previously transmitted bit (step 704). Next, the system determines if the given bit has the same state as the previously transmitted bit (step 706). If so, the system does not activate the current source. Otherwise, the system activates the current source to boost the signal of the transmitted bit (step 708).

Note that this process can be enhanced to optimize the shape of the transmitted signal by using multiple previously transmitted bits. Instead of reading the previously transmitted bit in step 704, the system reads the history of previously transmitted bits. Next, the system compares the history of previously transmitted bits to the given bit and determines which current sources to activate, replacing step 706.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for transmitting signals through a communication channel, comprising:
   receiving a sequence of bits for transmission through the communication channel;
   determining if a given bit in the sequence of bits has the same state as the previously transmitted bit;
   if so, using a voltage-mode driver to drive a signal for the given bit through the communication channel; and
   otherwise, using a current source coupled to the voltage-mode driver to boost the drive-level of the voltage-mode driver while transmitting the given bit;
   wherein a value of a resistor couple for driving the voltage-mode driver is set so that the impedance of the voltage-mode driver, substantially equals the impedance of the communication channel and wherein the current source supplies a current to the communication channel without changing the impedance of the voltage-mode driver, thereby compensating for frequency dependant losses in the communication channel without sacrificing impedance matching and without substantially increasing power consumption.

2. The method of claim 1, wherein the current source is activated independently from the voltage-mode driver, thereby facilitating the optimization of the shape of the transmitted signal.

3. The method of claim 1,
   wherein more than one current source is used to compensate for frequency dependant losses in the communication channel; and wherein each current source is activated separately from the other current sources as well as the voltage-mode driver, thereby facilitating the optimization of the shape of the transmitted signal.

4. The method of claim 1, wherein a sequence of previously transmitted bits is used to control the current source to compensate for the frequency dependant losses in the communication channel.

5. The method of claim 1, wherein the voltage-mode driver is a differential driver.

6. An apparatus for transmitting signals through a communication channel, comprising:
 a communication channel; and
 a transmitter;
 wherein the transmitter is configured to:
  receive a sequence of bits for transmission through the communication channel;
  determine if a given bit in the sequence of bits has the same state as the previously transmitted bit;
  if so, to use a voltage-mode driver to drive a signal for the given bit through the communication channel; and
  otherwise, to use a current source coupled to the voltage-mode driver to boost the drive-level of the voltage-mode driver while transmitting the given bit;
  wherein a value of a resistor coupled for driving the voltage-mode driver is set so that the impedance of the voltage-mode driver substantially equals the impedance of the communication channel and wherein the current source applies a current to the communication channel without changing the impedance of the voltage-mode driver, thereby compensating for frequency dependant losses in the communication channel without sacrificing impedance matching and without substantially increasing power consumption.

7. The apparatus of claim 6, wherein the current source is activated independently from the voltage-mode driver, thereby facilitating the optimization of the shape of the transmitted signal.

8. The apparatus of claim 6,
 wherein more than one current source is used to compensate for frequency dependant losses in the communication channel; and
 wherein each current source is activated separately from the other current sources as well as the voltage-mode driver, thereby facilitating the optimization of the shape of the transmitted signal.

9. The apparatus of claim 6, wherein a sequence of previously transmitted bits is used to control the current source to compensate for the frequency dependant losses in the communication channel.

10. The apparatus of claim 6, wherein the voltage-mode driver is a differential driver.

11. A computer system for transmitting signals through a communication channel, comprising:
 a communication channel; and
 a transmitter;
 wherein the transmitter is configured to:
  receive a sequence of bits for transmission through the communication channel;
  determine if a given bit in a sequence of bits has the same state as the previously transmitted bit;
  if so, to use a voltage-mode driver to drive a signal for the given Bit through the communication channel; and
  otherwise, to use a current source coupled to the voltage-mode driver to boost the drive-level of the voltage-mode driver while transmitting the given bit;
  wherein a value of a resistor coupled for driving the voltage-mode driver is set so that the impedance of the voltage-mode driver substantially equals the impedance of the communication channel and wherein the current source applies a current to the communication channel without changing the impedance of the voltage-mode driver, thereby compensating for frequency dependant losses in the communication channel without sacrificing impedance matching and without substantially increasing power consumption.

12. The computer system of claim 11, wherein the current source is activated independently from the voltage-mode driver, thereby facilitating the optimization of the shape of the transmitted signal.

13. The computer system of claim 11,
 wherein more than one current source is used to compensate for frequency dependant losses in the communication channel; and
 wherein each current source is activated separately from the other current sources as well as the voltage-mode driver, thereby facilitating the optimization of the shape of the transmitted signal.

14. The computer system of claim 11, wherein a sequence of previously transmitted bits is used to control the current source to compensate for the frequency dependant losses in the communication channel.

15. The computer system of claim 11, wherein the voltage-mode driver is a differential driver.

* * * * *

UNITED STATES PATENT AND TRADEMARK OFFICE
CERTIFICATE OF CORRECTION

PATENT NO. : 7,639,746 B2  Page 1 of 1
APPLICATION NO. : 11/173109
DATED : December 29, 2009
INVENTOR(S) : William P. Cornelius It is certified that error appears in the above-identified patent and that said Letters Patent is hereby corrected as shown below:

In claim 1 (at column 8, line 49), please delete the word, "couple" and replace with --coupled--.

In claim 1 (at column 8, line 51), after the word driver please delete ",".

In claim 6 (at column 9, line 24), please insert --also-- after "to" and before "use", so the line reads "otherwise, to also use a current source coupled to the voltage-".

In claim 6 (at column 9, line 31), please delete the word "applies" and replace with --supplies--.

In claim 11 (at column 10, line 17), please delete the word "Bit" and replace with --bit--.

In claim 11 (at column 10, line 18), please insert --also-- after "to" and before "use", so the line reads "otherwise, to also use a current source coupled to the voltage-".

In claim 11 (at column 10, line 25), please delete the word "applies" and replace with --supplies--.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,639,746 B2  Page 1 of 1
APPLICATION NO. : 11/173109
DATED : December 29, 2009
INVENTOR(S) : Cornelius et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Ninth Day of November, 2010

David J. Kappos
*Director of the United States Patent and Trademark Office*